United States Patent Office 2,973,320
Patented Feb. 28, 1961

2,973,320
DRILLING FLUID

John S. Brukner, Houston, Tex., assignor to Texaco Inc., a corporation of Delaware No Drawing. Filed Dec. 6, 1957, Ser. No. 700,941

11 Claims. (Cl. 252—8.5)

This invention relates to drilling fluids and to the drilling of wells through subsurface formations by means of well drilling tools. This invention particularly relates to a drilling operation, such as a rotary drilling operation, which involves the circulation of a drilling fluid down a well bore, about the drilling bit and back to the surface. In a rotary drilling operation a drilling fluid is pumped down the drill stem to the drilling bit at the bottom of the bore hole. The stream of drilling fluid then passes through the drilling bit and moves upwardly within the annular space between the drill stem and the well bore wall carrying with it the drilling cuttings.

A drilling fluid employed in a drilling operation should possess sufficient viscosity such that the drilling cuttings are readily carried out of the hole with the drilling fluid and are readily separated therefrom at the surface. At the same time the drilling fluid should possess sufficient gel strength so that when the circulation of drilling fluid through the bore hole stops the drilling cuttings remain suspended in the drilling fluid. Additionally, a drilling fluid should desirably possess a relatively low water loss, i.e., low loss of filtrate through the wall of the bore hole into the formation being drilled. Additionally, the drilling fluid should be stable with respect to temperature. More particularly, it is desirable that the drilling fluid does not change into a very viscous, plastic-like material or set up into a cement-like or rock-like material upon exposure to a relatively high temperature such as is sometimes encountered during a drilling operation.

Various additives have been proposed heretofore to improve the properties or desirable drilling characteristics of drilling fluids. For example, it has been the practice heretofore to employ viscosity reducing or thinning agents in a drilling fluid during a drilling operation to prevent the drilling fluid from becoming too viscous. Suitable viscosity reducing agents include quebracho, caustic quebracho, calcium lignosulfonate and the like. It has also been proposed heretofore to improve the fluid loss characteristics of drilling fluids by incorporating therein a fluid loss additive, such as carboxymethylcellulose, hydrolyzed starch, very finely divided insoluble solid materials and the like so as to reduce filtration loss. It has also been suggested heretofore to treat a drilling fluid chemically to improve its high temperature gelation properties so that the drilling fluid remains a relatively stable fluid at comparatively high temperatures, such as a temperature in excess of 250° F., e.g., in the range 300–425° F. and higher.

Accordingly, it is an object of this invention to provide an improved drilling fluid.

Another object of this invention is to provide an improved drilling method.

Still another object of this invention is to provide a drilling fluid composition having improved characteristics such as with respect to water loss, high temperature properties, viscosity, gel strength and the like.

Yet another object of this invention is to provide a method of treating a drilling fluid so as to improve the same.

Yet another object of this invention is to provide a suitable and convenient method of improving the properties of a drilling fluid.

How these and other objects of this invention are achieved will become apparent in the light of the accompanying disclosure.

In accordance with this invention it has now been discovered that an improved drilling method and an improved drilling fluid is obtained by incorporating in the drilling fluid a minor amount of water soluble citrate so that the drilling fluid contains an aqueous phase containing a minor amount of a water soluble citrate dissolved therein. By dissolving a minor amount of a water soluble citrate in the aqueous phase of a drilling mud or drilling fluid one or more of the various properties, e.g., water loss, gel strength, viscosity, high temperature gelation and the like, properties thereof is improved.

The practice of this invention is particularly applicable to the drilling fluids, water base drilling fluids, oil-in-water emulsion drilling fluids or water-in-oil emulsion drilling fluids, which contain an alkaline aqueous phase which is saturated with calcium hydroxide. Drilling muds which contain calcium hydroxide in an amount at least sufficient to saturate the aqueous phase thereof are sometimes referred to as limed or lime muds. Muds of this type appear to be sensitive to high temperature as evidenced by an increased viscosity. Sometimes, moreover, when these lime-containing drilling muds are permitted to remain undisturbed in a bore hole at a relatively high temperature for a substantial length of time these muds turn into plastic, semi-solid or rock-like materials, to the extent that they become unpumpable and must be removed by mechanical means such as by drilling.

By incorporating a minor amount of a water soluble citrate in the aqueous phase of a drilling fluid which is saturated with respect to calcium hydroxide the drilling fluid properties of such a mud are substantially improved. Accordingly, the practice of this invention is applicable to so-called low lime muds which are characterized as aqueous drilling muds containing an alkaline (pH about 12.0) aqueous phase which is saturated with calcium hydroxide and a small amount, in the range about 0.125–1.0 lb. of sodium hydroxide dissolved therein, yielding a drilling fluid having a relatively low calcium ion concentration, below about 200–250 parts per million weight (p.p.m.).

Also, the practice of this invention is particularly applicable to improving the properties of a so-called high pH lime mud, such as an aqueous drilling mud having an aqueous phase which is saturated with calcium hydroxide and contains dissolved therein a relatively large amount of sodium hydroxide, such as an amount of sodium hydroxide in the range 1–6 lbs. per barrel of drilling fluid. A high pH lime mud has a pH substantially above 12.0, such as a pH in the range 12.6–13.5, depending upon the amount of caustic soda added. A high pH lime mud, however, is characterized by a relatively low dissolved calcium or calcium ion concentration, e.g., a calcium ion concentration below 200 p.p.m., usually below 100 p.p.m.

The practice of this invention is particularly applicable to a high calcium, relatively low pH lime drilling fluid which has an aqueous phase characterized by a relatively high dissolved calcium or calcium ion concentration, above about 200 p.p.m., preferably in the range 300–1500 p.p.m. The aqueous phase of this drilling fluid is also characterized by a relatively low pH, not in excess of 12.6, the pH corresponding to a saturated aqueous solution of calcium hydroxide. A mud of this type which might be designated a low pH, high calcium lime mud is very useful for drilling through heaving shale formations. This type of mud is more thoroughly described in U.S. 2,802,-783, issued August 13, 1957, the disclosures of which patent are herein incorporated and made a part of this disclosure. The high temperature properties of this mud are improved by incorporating in the alkaline aqueous phase thereof a minor amount of lithium citrate effective to improve the high temperature properties and other properties of the drilling mud.

In the practice of this invention a minor amount of a water soluble citrate dissolved in the aqueous phase is sufficient to improve the properties of the drilling fluid so treated. Generally an amount of a water soluble citrate in the range 0.25–6.0, more or less, lbs. per barrel of drilling fluid dissolved in the aqueous phase of the drilling fluid is sufficient to yield a satisfactory drilling fluid in accordance with this invention. Larger amounts, up to about 10 lbs. per barrel of a water soluble citrate per barrel of drilling fluid, might be employed if desired or relatively small amounts, as small as 0.10 lb. of lithium citrate per barrel of drilling fluid might be employed, depending upon the extent of improvement sought.

Although emphasis has been placed in this disclosure with respect to the applicability of the practice of this invention to drilling fluids which contain an alkaline aqueous phase which is saturated with calcium hydroxide, it is pointed out that the practice of this invention is applicable to drilling fluids which contain an aqueous phase therein, whether the aqueous phase be continuous, as in water base or oil-in-water emulsion drilling muds, or discontinuous as in water-in-oil emulsion drilling fluids.

Any water soluble citrate is suitable in the practice of this invention, such as ammonium citrate or an alkali metal citrate, e.g. sodium citrate or potassium citrate, or mixtures of water soluble citrates. Particularly preferred in the practice of this invention is lithium citrate.

The following examples are indicative of the practice of this invention and demonstrate how, in accordance with this invention, various properties of the drilling fluid, such as viscosity and/or gel strength and/or water loss and/or high temperature properties are improved by incorporating in the aqueous phase thereof, a minor, effective amount of lithium citrate.

EXAMPLE 1

An aqueous base mud, actually a West Cote Blanche Bay spud mud containing 18% by volume total solids was treated in accordance with this invention by the addition of various amounts of lithium citrate thereto and then subjected to various tests. The results of these tests are set forth in accompanying Table I.

*Table I*

| Type Mud+Additions | Gels | | Viscosity, cps. | | pH | Water Loss (W.L.) (30 days) @ 100 p.s.i. | $P_m^1$ | $P_f^2$ | $M_f^3$ | $Ca^{++}$ (p.p.m.) |
|---|---|---|---|---|---|---|---|---|---|---|
| | 0 min. | 10 min. | $V_{600}$ | $V_{100}$ | | | | | | |
| Base Mud | 60+ | 60+ | >135 | >550 | 8.5 | 17.6 | 0.5 | 0.05 | 0.35 | 170 |
| Base Mud+1#/bbl. calcium lignosulfonate | 28 | 34 | 87.5 | 472.0 | 8.32 | 14.8 | 0.5 | 0.05 | 0.4 | 200 |
| Base Mud+1#/bbl. quebracho | 27 | 31 | 85.9 | 526.1 | 8.2 | 15.8 | 0.8 | 0.05 | 0.4 | 200 |
| Base Mud+¼#/bbl. lithium citrate | 40 | 60 | 109.0 | >550 | 8.58 | 14.8 | 0.45 | 0.05 | 0.5 | 240 |
| Base Mud+½#/bbl. lithium citrate | 23 | 39 | 70.0 | 360.5 | 8.58 | 13.9 | 0.5 | 0.05 | 0.65 | 280 |
| Base Mud+1#/bbl. lithium citrate | 20 | 20 | 76.2 | 351.3 | 8.62 | 12.0 | 0.3 | 0.05 | 1.4 | 360 |

[1] $P_m$ is defined as number of cc. of N/50 $H_2SO_4$ required to titrate 1 cc. of whole mud to a phenolphthalein end point.
[2] $P_f$ is defined as number of cc. of N/50 $H_2SO_4$ required to titrate 1 cc. of aqueous phase (filtrate) of drilling fluid to a phenolphthalein end point and is a measure of the soluble hydroxyl ion content.
[3] $M_f$ is defined as number of cc. of N/50 $H_2SO_4$ required to titrate 1 cc. of aqueous phase (filtrate) of drilling fluid to methyl orange end point and is a measure of the soluble hydroxyl and carbonate ion content.

EXAMPLE 2

An aqueous low lime base mud containing 1 lb. per barrel bentonite, 2½ lbs. per barrel lime, 2½ lbs. per barrel quebracho and ¼ lb. per barrel sodium hydroxide, the resulting mud containing 18% by volume total solids, was treated in accordance with the practice of this invention and subjected to various tests. The results of these tests are set forth in accompanying Table II.

*Table II*

| Type Mud+Additions | Gels | | Viscosity, cps. | | pH | W.L. @ 100 p.s.i. (30 min.) | $P_m$ | $P_f$ | $M_f$ | $Ca^{++}$ (p.p.m.) |
|---|---|---|---|---|---|---|---|---|---|---|
| | 0 min. | 10 min. | $V_{600}$ | $V_{100}$ | | | | | | |
| Low Lime Base Mud | 1.5 / 0 | 15 / 0 | 14.4 | 27.6 | 11.72 | 23.0 | 5.5 | 0.4 | 0.8 | 220 |
| Low Lime Base Mud+1#/bbl. quebracho | 0.5 / 0 | 3 / 0 | 13.6 | 14.9 | 11.5 | 24.0 | 5.3 | 0.2 | 0.6 | 240 |
| Low Lime Base Mud+1#/bbl. calcium lignosulfonate | 0.5 / 0 | 2 / 0 | 11.7 | 9.2 | 11.64 | 25.0 | 5.6 | 0.4 | 1.0 | 280 |
| Low Lime Base Mud+1#/bbl. lithium citrate | 0.5 / 0 | 1.0 / 0 | 11.7 | 8.0 | 11.8 | 22.0 | 5.5 | 0.4 | 2.0 | 480 |

EXAMPLE 3

A high pH lime mud comprising 1 lb. per barrel of bentonite, 2 lbs. per barrel X-Act clay, 7 lbs. per barrel lime, 2 lbs. per barrel quebracho and 2 lbs. per barrel sodium hydroxide, and containing 18% by volume total solids, was treated in accordance with the practice of this invention and subjected to various tests. The test results are set forth in accompanying Table III.

*Table III*

| Type Mud+Additions | Gels | | Viscosity, cps. | | pH | W.L. @ 100 p.s.i. (30 min.) | $P_m$ | $P_f$ | $M_f$ | $Ca^{++}$ (p.p.m.) |
|---|---|---|---|---|---|---|---|---|---|---|
| | 0 min. | 10 min. | $V_{600}$ | $V_{100}$ | | | | | | |
| High pH Lime Base Mud | 1 / 0 | 3.5 / 0 | 13.0 | 16.1 | 12.82 | 32.6 | 29.0 | 5.1 | 6.2 | 120 |
| High pH Lime Base Mud+1#/bbl. quebracho | 0.5 / 0 | 4 / 0 | 13.1 | 8.0 | 12.78 | 29.2 | 29.2 | 5.2 | 6.1 | 140 |
| High pH Lime Base Mud+1#/bbl. calcium lignosulfonate | 0.5 / 0 | 1.5 / 0 | 11.9 | 8.0 | 12.8 | 27.0 | 29.1 | 5.3 | 6.5 | 160 |
| High pH Lime Base Mud+1#/bbl. lithium citrate | 0.5 / 0 | 1.0 / 0 | 11.7 | 8.0 | 12.82 | 29.0 | 30.0 | 5.7 | 7.4 | 280 |

EXAMPLE 4

A drilling mud particularly suitable for drilling through heaving shale and the like comprising 7 lbs. per barrel of an admixture of calcium chloride, lime and calcium lignosulfonate in the weight ratio about 0.5:3:3, and containing 18% by volume total solids was treated in accordance with the practice of this invention by incorporating in the aqueous phase thereof varying amounts of lithium citrate. The resulting drilling muds were then subjected to various tests. The results of these tests are set forth in accompanying Table IV.

*Table IV*

| Type Mud+Additions | Gels | | Viscosity, cps. | | pH | W.L. @ 100 p.s.i. (30 min.) | $P_m$ | $P_t$ | $M_f$ | $Ca^{++}$ (p.p.m.) |
|---|---|---|---|---|---|---|---|---|---|---|
| | 0 min. | 10 min. | $V_{600}$ | $V_{100}$ | | | | | | |
| Shale Control Base Mud | 15.0 | 8.0 | 122.6 | >555 | 12.17 | 50.0 | 8.9 | 0.7 | 1.5 | 680 |
| Shale Control Base Mud+1#/bbl. lithium citrate | 4.0 / 0 | 6.0 / 0 | 38.3 | 186.8 | 12.22 | 41.0 | 9.3 | 1.25 | 2.3 | 840 |
| Shale Control Base Mud+2#/bbl. lithium citrate | 1.2 / 0 | 6 / 0 | 20.7 | 36.7 | 12.3 | 37.0 | 9.0 | 1.5 | 3.2 | 880 |
| Shale Control Base Mud+4#/bbl. lithium citrate | 1 / 0 | 8 / 0 | 17.5 | 26.4 | 12.35 | 30.5 | 9.2 | 1.8 | 4.6 | 1,040 |
| Shale Control Base Mud+6#/bbl. lithium citrate | 0.8 / 0 | 6 / 0 | 16.2 | 19.5 | 12.39 | 25.0 | 9.5 | 2.5 | 7.5 | 1,720 |

EXAMPLE 5

A hole (oil-in-water emulsion) mud comprising 21.5% by volume total solids, 12% by volume oil emulsified in the aqueous phase thereof, said aqueous phase being characterized by a calcium ion concentration in excess of 200 p.p.m. and a pH not in excess of 12.6, the resulting mud weighing 12.3 lbs. per gallon, was treated in accordance with the practice of this invention by incorporating varying amounts of lithium citrate therein. The resulting treated muds were then subjected to various laboratory tests. The results of these tests are set forth in accompanying Table V.

*Table V*

| Type Mud+Additions | Gels | | Viscosity, cps. | | pH | W.L. @ 100 p.s.i. (30 min.) | $P_m$ | $P_t$ | $M_f$ | $Ca^{++}$ (p.p.m.) |
|---|---|---|---|---|---|---|---|---|---|---|
| | 0 min. | 10 min. | $V_{600}$ | $V_{100}$ | | | | | | |
| Hole Mud | 3 / 0 | 30 / 0 | 58.7 | 73.2 | 12.0 | 7.2 | 8.0 | 0.4 | 1.6 | 520 |
| Hole Mud+1#/bbl. quebracho | 2 / 0 | 10 / 0 | 61.2 | 72.0 | 11.88 | 6.8 | 7.5 | 0.5 | 1.7 | 600 |
| Hole Mud+1#/bbl. calcium lignosulfonate | .2 / 0 | 6 / 0 | 52.1 | 50.4 | 11.92 | 7.0 | 8.0 | 0.5 | 1.7 | 610 |
| Hole Mud+¼#/bbl. lithium citrate | 2 / 0 | 10 / 0 | 56.5 | 64.1 | 12.0 | 5.8 | 8.6 | 0.4 | 1.8 | 560 |
| Hole Mud+½#/bbl. lithium citrate | 2 / 0 | 6 / 0 | 54.1 | 60.6 | 12.2 | 5.4 | 8.6 | 0.5 | 2.5 | 640 |
| Hole Mud+1#/bbl. lithium citrate | 2 / 0 | 4 / 0 | 45.3 | 43.5 | 12.3 | 5.4 | 8.6 | 0.6 | 3.4 | 760 |
| Hole Mud+2#/bbl. lithium citrate | 1.4 / 0 | 2 / 0 | 34.1 | 32.1 | 12.25 | 3.6 | 8.6 | 1.1 | 5.2 | 1,320 |

EXAMPLE 6

A low lime (oil-in-water emulsion) mud comprising 23% by volume total solids, 11% by volume oil emulsified in the aqueous phase thereof was treated in accordance with this invention by incorporating in the aqueous phase thereof a minor amount of sodium citrate. The above described muds, before and after treatment in accordance with this invention, were then subjected to various tests. The result of these tests are set forth in accompanying Table VI. As illustrated in the data set forth in accompanying Table VI the high temperature property of the treated mud was improved with respect to the untreated mud.

*Table VI*

| Type Mud+Additions | Properties Before Bombing | | | | | | Properties after Bombing 24 hrs. at 350° F. | |
|---|---|---|---|---|---|---|---|---|
| | Gels | | pH | $P_m$ | $P_t$ | $M_f$ | Appearance After Bombing | Shear, #/100 ft.² |
| | 0' | 10' | | | | | | |
| Low Lime Mud | 1 / 0 | 6 / 0 | 12.13 | 6.8 | 1.2 | 2.2 | Plastic | 875 |
| Low Lime Mud+1#/bbl. sodium citrate | 0.8 / 0 | 1.8 / 0 | 12.21 | 7.2 | 1.4 | 2.8 | Fluid—High Gels | 765 |

As indicated by the test data set forth hereinabove with reference to Examples 1–6, a drilling fluid having an aqueous phase containing dissolved therein a minor amount of a water soluble citrate evidences improved properties with respect to viscosity and/or gel strength and/or water loss and/or high temperature as compared with other muds which do not contain lithium citrate dissolved in the aqueous phase thereof.

As will be apparent to those skilled in the art various modifications, substitutions and changes are possible in the practice of this invention without departing from the spirit or scope thereof.

I claim:

1. An aqueous drilling fluid comprising clayey material dispersed in an alkaline aqueous phase, said aqueous phase containing dissolved therein calcium hydroxide in an amount sufficient to saturate said aqueous phase and an effective minor amount in the range 0.1–10 lbs. per bbl. of drilling fluid of lithium citrate.

2. An aqueous drilling fluid comprising an aqueous phase containing clay solids dispersed in an alkaline aqueous phase, said aqueous phase being saturated with calcium hydroxide and containing a water soluble citrate dissolved therein in an amount of at least 0.25 lb. per barrel of drilling fluid.

3. An aqueous drilling fluid comprising hydratable clay solids dispersed in an alkaline aqueous phase, said aqueous phase being saturated with calcium hydroxide and containing lithium citrate dissolved therein in an amount in the range of 0.25–6.0 lbs. per barrel of drilling fluid.

4. An aqueous drilling fluid containing hydratable clay solids dispersed in an alkaline aqueous phase, said aqueous phase being saturated with respect to calcium hydroxide and having a calcium ion concentration of at least 200 parts per million by weight based on said aqueous phase and an amount of lithium citrate in the range 0.25–6.0 lbs. per barrel of drilling fluid dissolved in said aqueous phase, said aqueous phase having a pH not in excess of 12.6.

5. An aqueous drilling fluid comprising hydratable clayey material, an aqueous phase containing said hydratable clayey material dispersed therein, lime dissolved in said aqueous phase in an amount sufficient to saturate said aqueous phase, sodium hydroxide dissolved in said aqueous phase in an amount sufficient that the pH of said aqueous phase is above 12.6 and at least 0.25 lb. of lithium citrate per barrel of drilling fluid dissolved in said aqueous phase.

6. An aqueous drilling fluid comprising hydratable clayey material dispersed in an alkaline aqueous phase, said aqueous phase consisting essentially of calcium hydroxide dissolved therein in an amount sufficient to saturate said aqueous phase and an effective amount in the range 0.1–10 lbs. per bbl. of drilling fluid of lithium citrate dissolved in said aqueous phase.

7. An aqueous drilling fluid comprising hydratable clayey material dispersed in an alkaline aqueous phase, said alkaline aqueous phase consisting essentially of calcium hydroxide dissolved therein in an amount at least sufficient to saturate said aqueous phase and an amount of lithium citrate in the range 0.25–6.0 lbs. per barrel of drilling fluid dissolved in said aqueous phase.

8. An aqueous drilling fluid comprising an alkaline aqueous phase, hydratable clayey material dispersed in said aqueous phase, and a clay dispersing agent, said aqueous phase comprising an amount of calcium hydroxide dissolved therein sufficient to saturate said phase and at least 0.25 lb. of lithium citrate per barrel of drilling fluid dissolved in said aqueous phase.

9. An aqueous drilling fluid comprising an alkaline aqueous phase, hydratable clayey material dispersed in said aqueous phase, and a clay dispersing agent, said aqueous phase consisting essentially of an amount of calcium hydroxide dissolved therein sufficient to saturate said phase and at least 0.25 lb. of lithium citrate per barrel of drilling fluid dissolved in said aqueous phase.

10. An aqueous drilling fluid comprising an alkaline aqueous phase containing calcium hydroxide dissolved therein in an amount sufficient to saturate said aqueous phase and lithium citrate dissolved therein in an amount at least about 0.25 lb. per barrel of drilling fluid.

11. In a drilling operation wherein a drilling fluid is circulated down the bore hole, about the drilling bit and back to the surface the improvement which comprises employing as said drilling fluid an aqueous drilling fluid comprising clayey material dispersed in an alkaline aqueous phase, said aqueous phase containing dissolved therein calcium hydroxide in an amount sufficient to saturate said aqueous phase and a minor amount in the range 0.1–10 lbs. per bbl. of drilling fluid of lithium citrate.

References Cited in the file of this patent
UNITED STATES PATENTS

| 2,343,113 | Jones | Feb. 29, 1944 |
| 2,491,437 | Perkins | Dec. 13, 1949 |
| 2,802,783 | Weiss et al. | Aug. 13, 1957 |

OTHER REFERENCES

"The Treatment of the Mud Fluids Used in Drilling Operations," article in "Petroleum" Zeitschrift, issue No. 44, Nov. 2, 1932, pages 7 and 8.

UNITED STATES PATENT OFFICE
CERTIFICATION OF CORRECTION

Patent No. 2,973,320                                February 28, 1961

John S. Brukner

It is hereby certified that error appears in the above numbered patent requiring correction and that the said Letters Patent should read as corrected below.

Columns 5 and 6, Table V, fourth column thereof, under the heading, "Viscosity, cps.-$V_{600}$", second line, for "61.2" read -- 62.1 --; column 6, line 75, strike out "a water soluble" and insert instead -- lithium --.

Signed and sealed this 11th day of July 1961.

(SEAL)
Attest:

ERNEST W. SWIDER                                      DAVID L. LADD

Attesting Officer                                         Commissioner of Patents